UNITED STATES PATENT OFFICE.

GEORGE P. DARROW, OF CINCINNATI, OHIO.

IMPROVED COMPOSITION FOR MOLDERS' MATCH-PLATES.

Specification forming part of Letters Patent No. 56,187, dated July 10, 1866.

*To all whom it may concern:*

Be it known that I, GEORGE P. DARROW, of Cincinnati, Hamilton county, Ohio, have invented a new and useful Composition for Molders' Match-Plates and Follow-Boards; and I do hereby declare the following to be a full, clear, and exact description thereof and of my mode of compounding the same.

The object of my invention is a material or composition for match-plates and follow-boards, and kindred uses, which, while as easily made and applied as ordinary plaster, is free from the shrinkage in setting to which plaster is subject, and which, by its greater hardness and toughness, is far more sharp and clearly defined in its angles, and less liable to injury in use.

I take of caustic plaster-of-paris in the form of powder, forty parts; fine iron-dust, such as iron filings and borings sifted, twenty parts; sal-ammoniac, one part. I mix the plaster and iron well together, and add thereto the sal-ammoniac dissolved in as much water as will hold it in solution. I then add sufficient clear water to impart to the mass the requisite amount of fluidity, and stir or otherwise mix all of the ingredients well together before running into molds.

I have selected to illustrate my invention the proportions and mode of compounding found effective by me in actual use, but do not desire to restrict the invention to the precise proportions above, so long as the results are attained by the same ingredients compounded substantially as set forth.

I claim herein as new and of my invention—

The manufacture of molders' match-plates and follow-boards by the use of plaster-of-paris, iron-dust, and sal-ammoniac in solution, substantially as and for the purpose set forth.

In testimony of which invention I hereunto set my hand.

GEO. P. DARROW.

Witnesses:
GEO. H. KNIGHT,
JAMES H. LAYMAN.